2,903,078

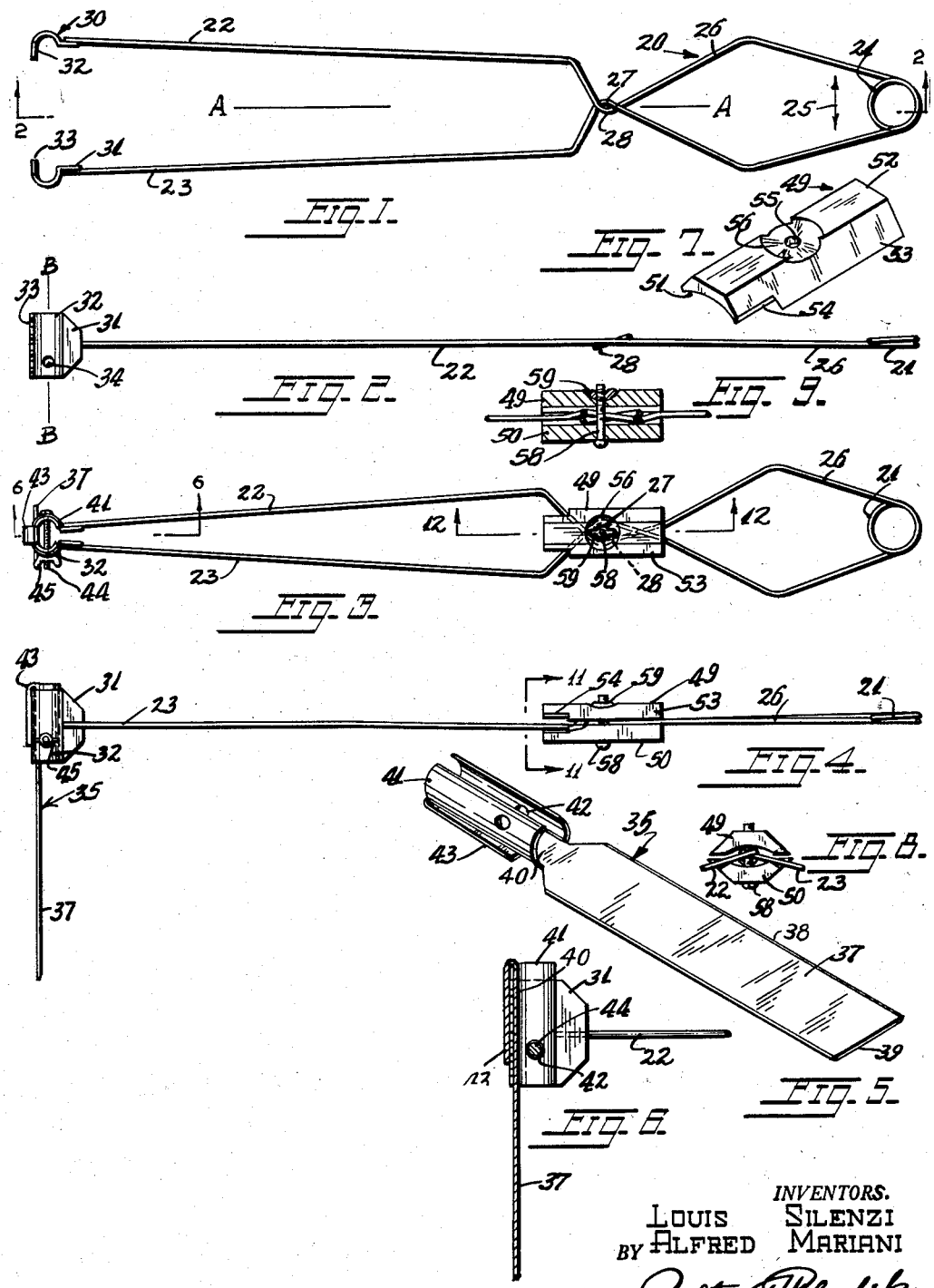

UTILITY GARDEN TOOL

Louis Silenzi, Bronx, and Alfred Mariani, Tuckahoe, N.Y.

Application August 13, 1956, Serial No. 603,733

2 Claims. (Cl. 172—371)

This invention relates to the art of garden tools and particularly concerns a general utility tool adapted for a plurality of uses.

According to the invention, the tool has a primary article lifting or holding body member and an attachment therefor, so arranged that the tool may be used as a weeder, chopper, sickle, etc.

It is a principal object to provide an inexpensive tool which will operate to facilitate the work in gardening, park and lawn maintenance and similar activities.

It is another object to provide an attachment for an article holding tool useful for general purposes in gardening.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a plan view of a utility garden tool made in accordance with one form of the present invention, in inoperative position.

Fig. 2 is a longitudinal sectional view taken on the line 2—2 of Fig. 1.

Fig. 3 is a view similar to Fig. 1 showing a modified form of tool, with a cutting tool attachment supported thereby in operative position.

Fig. 4 is an edge view of the utility garden tool shown in Fig. 3.

Fig. 5 is an enlarged perspective view of the cutting tool attachment shown in Fig. 3.

Fig. 6 is a sectional view taken on the plane of the line 6—6 of Fig. 3.

Fig. 7 is an enlarged perspective view of one of the clamping members shown in Fig. 3.

Fig. 8 is a cross sectional view taken on the plane of the line 11—11 of Fig. 4.

Fig. 9 is a horizontal sectional view taken on the plane of the line 12—12 of Fig. 3.

In Figs. 1 and 2 is shown the primary holding device 20 formed by bending and twisting a resilient metal rod or wire. The device is formed at one end with legs or shafts 22, 23. The other end 21 is coiled and serves as a spring. Between shafts 22, 23 and spring portion 21 is a handle portion 26 which has the general form of a parallelogram. The handle portion is formed by twisting one shaft over the other to form obtuse angled V-shaped loops 27, 28 which are engaged in each other. The spring 21 tends to open the sides of the handle as indicated by arrow 25 so that the loops 27, 28 are engaged by each other. At each end of each shaft 22, 23 is a gripping member 30 secured thereto by welding or the like. The gripping member includes a flat end or base plate 31 from which extends outwardly a substantially semicylindrical jaw 32 having a serrated linear end 33. Each of the members 30 has an aperture 34. The serrated ends 33 have teeth arranged to fit into each other when the jaws are brought together. The axes B—B of jaws 32 are perpendicular to axis A—A of device 20.

In Figs. 3 and 4 the shafts 22, 23 are shown supporting a cutting attachment 35. This attachment is best shown in Figs. 5 and 6. It consists of an elongated flat plate or blade 37 which has beveled lateral cutting edges 38 and a terminal cutting edge 39. The other end of the blade 37 has a flat portion 40 with sides bent to form upstanding substantially semicylindrical walls 41. Apertures 42 are located in alignment with each other in side walls 41. A flat hook 43 is formed integral with and depends from the free end of blade portion 40.

In Figs. 3, 4 and 6, hook 43 is shown engaged outside of and over the juxtaposed ends of jaws 32. Jaws 32 are located on the outside of walls 41. Blade 37 extends perpendicular to the shafts 22, 23. A bolt 44 extends through apertures 34 and 42 in jaws 32 and walls 41 and is secured by a wing nut 45. The loops 27, 28 are held together by a pair of clamping members 49, 50.

These clamping members, as clearly shown in Figs. 3, 4, 7, 8 and 9, are each formed from generally rectangular blocks of wood, metal, or plastic. Each member has a curved inner surface 51 and flat outer surface 52. The outer sides 53 of the member are chamfered and have terminal undercut recesses 54 at one end of each side 53. A central aperture 55 and a recessed seat 56 are centrally located in the black. Clamping members 49, 50 are secured together by a bolt 58 which passes through aperture 55 and is secured by a wing nut 59 threaded on the bolt and seated in seat 56. When the wing nut is tightened the loops 27, 28 are securely held together so that the device can be held by handle 26 and swung so that blade 37 moves in an arc to perform a cutting motion like a scythe.

If desired, the primary holder 20 shown in Fig. 1 may be used as a lifting device. By pressing the two sections of handle 26 together in a direction opposite to arrow 25 the jaws 32 may be forced together. The device may thus be used to pick up and hold various articles between the jaws. The articles will be released automatically when the sections of the handle are released.

While we have illustrated and described the preferred embodiment of our invention, it is to be understood that we do not limit ourselves to the precise constructions herein disclosed and that various changes and modifications may be made within the scope of the invention as defined in the appended claims.

Having thus described our invention, what we claim as new, and desire to secure by United States Letters Patent is:

1. A garden tool of general utility, comprising a flexible rod having a coiled spring formed at one end with divergent members extending therefrom, said members defining a handle portion having a generally parallelogrammic configuration, said members being twisted at the end of said portion to form interengaged loops, said loops being generally obtuse angled V-shaped, and a pair of gripping elements disposed at the free ends of said members, each of said elements comprising a flat plate portion secured to a free end of said member and an integrally formed curved jaw portion having a serrated linear edge, the serrated edges of said jaws being arranged to fit into each other, said jaw portions having opposed openings, a cutting tool having a flat blade with beveled edges, a hook, and semicylindrical walls, said hook and walls being arranged in engagement with said jaws, said walls having opposed openings registering with the openings in the jaw portions and a fastening member extending through the registered openings securing the jaw portions and walls together.

2. A garden tool of general utility, comprising a flexible rod having a coiled spring formed at one end with divergent members extending therefrom, said members defining a handle portion having a generally parallelogrammic configuration, said members being twisted at the end of said portion to form interengaged loops, said loops being generally V-shaped, a pair of gripping elements disposed at the free ends of said members, each of said elements comprising a flat plate portion secured to a free end of said member and an integrally formed curved jaw portion having a serrated linear edge, the serrated edges of said jaws being arranged to fit into each other, and a cutting tool having a flat blade, a hook and semicylindrical walls, said walls conforming in curvature to said jaws and being held in engagement therewith by threaded means, said hook being also in engagement with said jaws, said jaws being disposed between the hook and said walls, and a pair of clamping members secured to said loops, at their point of engagement.

References Cited in the file of this patent

UNITED STATES PATENTS

| | | |
|---|---|---|
| 907,333 | Gesford | Dec. 22, 1908 |
| 1,073,565 | Biehl | Sept. 16, 1913 |
| 1,634,856 | Skroch | July 5, 1927 |
| 1,873,215 | Pyatt | Aug. 23, 1932 |
| 2,203,714 | Baer | June 11, 1940 |
| 2,378,459 | Beardsley | June 19, 1945 |
| 2,650,530 | Schmidt | Sept. 1, 1953 |
| 2,686,329 | King | Aug. 17, 1954 |
| 2,761,165 | Krzanowski | Sept. 4, 1956 |
| 2,768,856 | Wright | Oct. 30, 1956 |

FOREIGN PATENTS

| | | |
|---|---|---|
| 14,706 | Norway | Dec. 4, 1905 |